(12) United States Patent
Li et al.

(10) Patent No.: US 8,681,820 B2
(45) Date of Patent: Mar. 25, 2014

(54) INSERTING OUT-OF-BAND DATA INTO IN-BAND DATA STREAMS

(75) Inventors: Shiping Li, Acton, MA (US); Tolga Asveren, Bordentown, NJ (US); Keith M. Conger, Foxboro, MA (US); Ronald V. Grippo, Red Bank, NJ (US)

(73) Assignee: Sonus Networks, Inc., Westford, MA (US)

( * ) Notice: Subject to any disclaimer, the term of this patent is extended or adjusted under 35 U.S.C. 154(b) by 344 days.

(21) Appl. No.: 13/100,035

(22) Filed: May 3, 2011

(65) Prior Publication Data

US 2012/0281690 A1 Nov. 8, 2012

(51) Int. Cl.
*H04J 3/24* (2006.01)

(52) U.S. Cl.
USPC ............................ 370/474; 370/392; 370/465

(58) Field of Classification Search
USPC ................. 370/474, 392, 473, 471, 356, 465; 709/231
See application file for complete search history.

(56) References Cited

U.S. PATENT DOCUMENTS 7,817,628 B2 * 10/2010 Pelletier et al. ............... 370/389
8,306,063 B2 * 11/2012 Erdal et al. .................... 370/474

* cited by examiner

*Primary Examiner* — Chandrahas Patel
(74) *Attorney, Agent, or Firm* — Straub & Pokotylo; Michael P. Straub; Stephen T. Straub (57) ABSTRACT

A computer-implemented method for inserting an out-of-band signaling packet into a real-time protocol (RTP) stream is provided. The method includes receiving the out-of-band signaling packet intended for transmission to a user device and forming a synthesized packet based on payload information from the out-of-band signaling packet and header information stored in a data structure describing the RTP stream. The method also includes inserting the synthesized packet into the RTP stream. The method further includes receiving an RTP packet intended for transmission to the user device via the RTP stream, analyzing an insertion sequence number and an insertion flag maintained in the data structure, and discarding or forwarding the RTP packet via the RTP stream based on the analyzing.

17 Claims, 3 Drawing Sheets

INSERTING OUT-OF-BAND DATA INTO IN-BAND DATA STREAMS

FIELD OF THE INVENTION

The invention relates generally to systems and methods for inserting out-of-band data into in-band data streams, and more particularly to inserting out-of-band signaling data into Real-Time Transport Protocol (RTP) streams for in-band data transmission.

BACKGROUND OF THE INVENTION

In-band signaling involves the transmission of control information in the same communication channel used for voice or data communication. Exemplary control information includes information about call setup, call routing, caller-ID, etc. In contrast, out-of-band signaling data travels over a separate path from voice and data calls.

To provide an integrated routing experience, an edge device, such as a routing switch or a session border controller (SBC), often needs to convert out-of-band data into in-band data, in the form of RTP packets for example, and insert the converted data into an in-band data stream, such as into an RTP stream. In addition, an edge device needs to be able to execute this type of conversion and insertion for many RTP streams simultaneously.

An edge device can use digital signal processors (DSPs) to perform such tasks. For example, when out-of-band data needs to be inserted into a particular RTP stream, an edge device can use one or more DSPs to terminate the incoming stream and then generate an outgoing stream with new RTP packets carrying out-of-band data inserted into the outgoing stream. However, this approach is expensive because DSPs are required. According to another known approach, an edge device can insert new packets carrying out-of-band data into an RTP stream by re-sequencing all the packets in the stream without discarding any existing in-band RTP packets. However, the computational complexity involved for such an operation is quite high.

Hence, efficient systems and methods are needed for inserting out-of-band data into in-band data streams without using dedicated resources, such as DSPs, or requiring high computational complexities.

SUMMARY OF THE INVENTION

The invention, in various embodiments, features systems and methods for efficiently inserting out-of-band data into in-band data streams. These systems and methods are advantageous because they can be scaled to accommodate the insertion of out-of-band data into hundreds and thousands of RTP streams simultaneously. The systems and methods are also robust, allowing synthesized packets to be inserted into RTP streams when needed, regardless of when in-band RTP packets are received by an edge device. This is because an edge device can "steal" the sequence numbers of RTP packets prior to their arrival at the edge device and use the stolen sequence numbers to insert and transmit new RTP packets synthesized from out-of-band data. Furthermore, the systems and methods are efficient as they can perform out-of-band data insertions without using dedicated DSPs or other components with high computational complexities.

In one aspect, a computer-implemented method for inserting an out-of-band signaling packet into a real-time protocol (RTP) stream is provided. The method includes receiving the out-of-band signaling packet intended for transmission to a user device. The method also includes forming a synthesized packet based on payload information from the out-of-band signaling packet and header information stored in a data structure describing the RTP stream. The synthesized packet is then inserted into the RTP stream. The method further includes receiving an RTP packet intended for transmission to the user device via the RTP stream, analyzing an insertion sequence number and an insertion flag maintained in the data structure, and discarding or forwarding the RTP packet via the RTP stream based on the analyzing.

In another aspect, a computing device for inserting an out-of-band signaling packet into a real-time protocol (RTP) stream is provided. The computing device includes a data structure describing the RTP stream. The data structure maintains an insertion sequence number and an insertion flag. The computing device also includes a fast path module for receiving an RTP packet intended for transmission to the user device via the RTP stream. The fast path module can also analyze the insertion sequence number and the insertion flag stored in the data structure and discard or forward the RTP packet based on the analyzing. The computing device further includes a slow path module for receiving the out-of-band signaling packet intended for transmission to a user device. The slow path module can form a synthesized packet based on payload information from the out-of-band signaling packet and header information stored in the data structure. The slow path module can further insert the synthesized packet into the RTP stream.

In yet another aspect, a computer program product, tangibly embodied in a computer readable medium, is provided for inserting an out-of-band signaling packet into a real-time protocol (RTP) stream. The computer program product includes instructions being operable to cause data processing apparatus to receive the out-of-band signaling packet intended for transmission to a user device, form a synthesized packet and insert the synthesized packet into the RTP stream. The synthesized packet based on payload information from the out-of-band signaling packet and header information stored in a data structure describing the RTP stream. The computer program product also includes instructions being operable to cause data processing apparatus to receive an RTP packet intended for transmission to the user device via the RTP stream, analyze an insertion sequence number and an insertion flag maintained in the data structure, and discard or forward the RTP packet based on the analysis.

In still another aspect, an apparatus for inserting an out-of-band signaling packet into a real-time protocol (RTP) stream is provided. The apparatus includes means for receiving the out-of-band signaling packet intended for transmission to a user device and means for forming a synthesized packet based on payload information from the out-of-band signaling packet and header information stored in a data structure describing the RTP stream. The apparatus further includes means for inserting the synthesized packet into the RTP stream and means for receiving an RTP packet intended for transmission to the user device via the RTP stream. The apparatus further includes means for analyzing an insertion sequence number and an insertion flag maintained in the data structure, and means for discarding or forwarding the RTP packet via the RTP stream based on the analyzing.

In other examples, any of the aspects above can include one or more of the following features. In various embodiments, the synthesized packet includes i) a payload including payload information from the out-of-band signaling packet and ii) a header with header information stored in a data structure describing the RTP stream. In various embodiments, the synthesized packet further includes a timestamp associated with a signaling event.

In some embodiments, after inserting the synthesized packet into the RTP stream, the insertion flag is set. The insertion sequence number in the data structure is updated to signal to the computing device to discard the RTP packet carrying the insertion sequence number.

In various embodiments, the RTP packet is discarded if the insertion flag is set and a sequence number of the RTP packet is equal or behind the insertion sequence number before the computing device discards the RTP packet. The sequence number of the RTP packet can be behind the insertion sequence number by less than a predetermined number of RTP packets the computing device is allowed to consume for out-of-band signaling. The RTP packet can be forwarded via the RTP stream if the insertion flag is not set or a sequence number of the RTP packet exceeds the insertion sequence number.

In various embodiments, the fast path module can process the RTP packet by storing header information of the RTP packet in the data structure.

In various embodiments, updating the insertion sequence number includes adding one to a sequence number of a last RTP packet that the computing device most recently processed and did not discarded. In such a case, the computing device has not formed another synthesized packet since processing the last RTP packet.

In various embodiments, updating the insertion sequence number includes adding one to the insertion sequence number. In such a case, the computing device has formed at least one other synthesized packet since last processing an RTP packet that was not discarded by the computing device.

In various embodiments, the slow path module includes a scheduler for scheduling an insertion task for an out-of-band signaling event. The slow path module also includes a buffer for storing the insertion task until an insertion module processes the insertion task.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
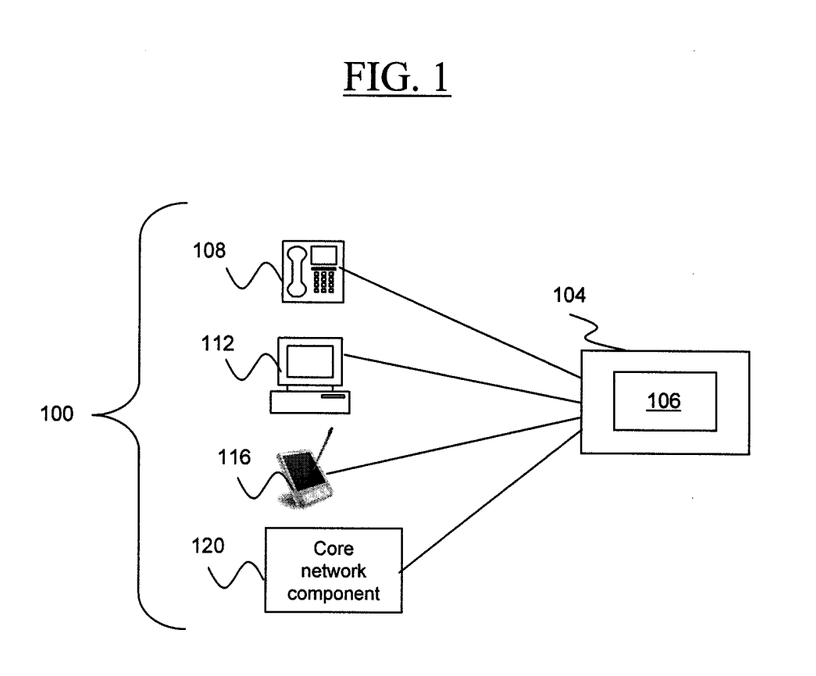
FIG. 1 shows a schematic diagram of an exemplary network environment for inserting out-of-band data into in-band data streams.

FIG. 1 shows a schematic diagram of an exemplary network environment including one or more user devices 100 coupled to an edge device 104 having a communication system 106.

A user device 100 can be, for example, a telephone 108, a computer 112, a personal digital assistant (PDA) 116, or other electronic devices capable of interfacing with the edge device 104. A user device 100 can include a core network component 120, which can be telephone switches, soft switches, or session border controllers. The edge device 104 can be, for example, a router, a routing switch, an integrated access device (IAD), a multiplexer, a session border controller, or any device that can provide entry points or connections to network components and services. In certain embodiments, the edge device 104 is a Network Border Switch manufactured by Sonus Networks, Inc., such as an NBS 9000 or NBS 5200. In some embodiments, the edge devices 104 is controlled by a service provider or an enterprise, and the user devices 100 are installed at client premises or can be portable.

The communication system 106 of the edge device 104 operates by receiving and forwarding communication signals among the user devices 100. Data processed and communicated by the communication system 106 can be in the form of one or more in-band RTP packets or other types of IP packets. In some embodiments, the communication system 106 can process and communicate in-band RTP data packets from one device 100 to another. The data packets form an RTP data stream. In some embodiments, the communication system 106 receives one or more out-of-band packets from one device 100 for transmission to another device 100. In such an instance, the communication system 106 can manufacture new RTP packets from the received out-of-band data and insert the manufactured packets into the RTP stream. In addition, the communication system 106 is adapted to execute packet insertions for many RTP streams simultaneously.

Figure 2:
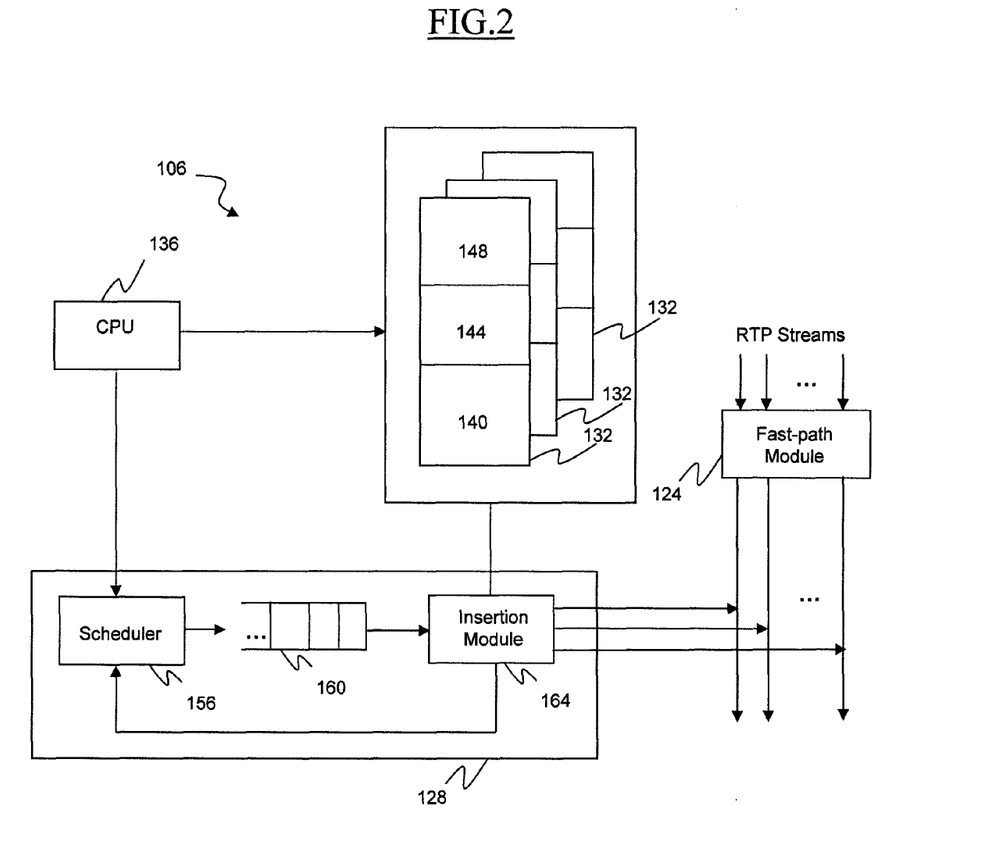
FIG. 2 shows a schematic diagram of an exemplary communication system of FIG. 1.

FIG. 2 shows an exemplary architecture of the communication system 106 of FIG. 1. The communication system 106 includes a fast-path module 124, a slow-path module 128, shared data structures 132, and a central processing unit (CPU) 136.

The CPU 136 manages the transmission of out-of-band data via one or more RTP streams supported by the edge device 104. In some embodiments, the CPU 136 provides an application program interface (API) to perform the management function. The fast path module 124 and the slow-path module 128 interact through the shared data structures 132. Each shared data structure 132 stores information about an RTP stream. At the direction of the CPU 136, the slow-path module 128 is configured to synthesize RTP packets based on out-of-band data received for each RTP stream. The slow-path module 128 is also configured to insert the synthesized packets into the corresponding RTP streams for transmission to their respective user devices 100. After each insertion, the slow-path module 128 can update pertinent information in the shared data structure 132 of the RTP stream. The fast-path module 124 is configured to process received in-band RTP packets and record pertinent information about the packets in their corresponding shared data structures 132. The fast-path module 124 can also decide whether to transmit a processed RTP packet via its RTP stream based on information about the stream stored in the shared data structure 132. For example, the fast-path module 124 can discard a processed RTP packet if its sequence number has been stolen by the slow-path module 128 prior to the arrival of the RTP packet at the fast-path module 124. Instead, the slow-path module 128 can assign the stolen sequence number to a packet manufactured from out-of-band data associated with the RTP stream and transmit the new packet via the RTP stream.

In operation, the CPU 136, upon detecting the start of an out-of-band signaling event, is adapted to identify the RTP stream to insert out-of-band data associated with the event.

The RTP stream can be identified by its User Datagram Protocol (UDP) port ID, for example. In some embodiments, the CPU 136 sends a START command to the slow-path module 128 to signal to the slow-path module 128 the start of an out-of-band signaling event. The START command can include information about the signaling event such as the UDP port ID of the RTP stream, payload type of the out-of-band packets and a sampling rate. Similarly, upon detecting the end of an out-of-band signaling event, the CPU 136 identifies the RTP stream for which insertion of out-of-band data is no longer needed. The CPU 136 then sends an END command to the slow-path module 128 to signal to the slow-path module 128 the end of the signaling event.

In some embodiments, the CPU 136 interacts with the shared data structure 132 to process data associated with an out-of-band signaling event. The CPU 136, upon detecting an out-of-band signaling event, can identify the RTP stream for the event and retrieve the shared data structure 132 corresponding to the RTP stream. The CPU 136 can store in the shared data structure 132 information related to the out-of-band signaling event such as volume, duration and sampling rate of the event.

Each shared data structure 132 stores information about an RTP stream updated by at least one of the fast-path module 124 or the slow-path module 128. In some embodiments, a shared data structure 132 includes a storage area 140 for storing information about the most recent in-band RTP packet processed by the fast-path module 124. Exemplary information in the storage area 140 includes recorded header of the RTP packet and local arrival time of the RTP packet. A header of an RTP packet can provide, for example, synchronization source identifier, timestamp, a sequence number assigned to the packet, and payload type of the packet.

In some embodiments, the shared data structure 132 includes a storage area 144 for storing information about an out-of-band signaling event for the RTP stream. For example, the storage area 144 can include a pointer to an address in a memory buffer used by the slow-path module 132 to determine the location at which the next RTP packet is synthesized from the out-of-band data stored in the memory buffer. The storage area 144 can also generate a time stamp indicating when the first synthesized packet associated with an out-of-band signaling event is inserted and transmitted via the RTP stream by the slow-path module 128. In addition, the same time stamp can be applied to all subsequent transmission of synthesized packets for the same signaling event. The time stamp can be computed as the recorded time stamp of the most recent RTP packet processed by the fast-path module 124 plus the difference between the current time and the local arrival time of the most recent RTP packet. When manufacturing RTP packets from out-of-band data for a signaling event, the slow-path module 128 can include the time stamp in the header of each of the manufactured packets.

In some embodiments, the shared data structure 132 includes a storage area 148 for storing variables regulating the insertion of one or more synthesized packets into the RTP stream corresponding to the shared data structure 132. One exemplary variable is an insertion sequence number that indicates the sequence number of an RTP packet stolen by the slow-path module 128 and reassigned to a new packet manufactured from out-band data. Another exemplary variable is an insertion flag that indicates whether a packet synthesized by the slow-path module 128 has been inserted into the RTP stream since the fast-path module 124 last transmitted an in-band RTP packet via the same stream.

The slow-path module 128 includes a scheduler 156, a buffer 160 and an insertion module 164. The scheduler 156 schedules tasks for execution by the insertion module 164. Each task identifies the RTP stream requiring the insertion of a synthesized RTP packet manufactured from out-of-band information. After the scheduler 156 generates a task, the scheduler 156 stores the task in the buffer 160 that is configured to provide insertion tasks to the insertion module 164 on a first-in-first-out basis or any other order of service. In response to the receipt of a task from the buffer 160, the insertion module 164 retrieves information stored in the shared data structure 132 about the RTP stream identified by the task. The insertion module 164 can assemble an RTP packet from out-of-band data based on the information stored in the shared data structure 132. The insertion module 164 can then transmit the synthesized RTP packet to the user device 100 associated with the RTP stream.

In some embodiments, the scheduler 156 generates a first insertion task for an RTP stream after receiving a START command from the CPU 136. The scheduler 156 can schedule the first insertion task within 5 ms of the receipt of the START command, for example. After the insertion module 164 executes the first task, the insertion module 164 is adapted to schedule additional insertion tasks for the RTP stream with the scheduler 156 until the scheduler 156 receives an END command from the CPU 136 for the particular RTP stream. In some embodiments, the insertion module 164 schedules insertion tasks for an RTP stream at a periodic interval. In some embodiments, the insertion module 164 schedules insertion tasks for an RTP stream at an interval varied based on the size of the linked list that stores out-of-band data for the RTP stream. For example, if there are 128 or more signaling events in the linked list, the insertion module 164 schedules an insertion task every 20 µs. If there are less than 128 signaling events in the linked list, the insertion module 164 adjusts the insertion period based on the actual length of the linked list, such as every 40 µs, 80 µs or 160 µs. The insertion module 164 can adjust the period for scheduling insertion tasks every 50 ms, for example.

After receiving an END command from the CPU 136 for a particular RTP stream, the insertion module 164 can schedule with the scheduler 156 the transmission of the END packet from the corresponding linked list within 5 ms of the receipt of the END command. In some embodiments, after transmitting the END packet, the insertion module 164 schedules with the scheduler 156 the retransmission of the END packet at, for example, a 20 ms retransmission interval from the last END packet transmission, unless another START command is received for the same RTP stream within the retransmission interval. In some embodiments, after retransmitting the END packet, the insertion module 164 removes all the out-of-band data associated with the signaling event from the linked list of the RTP stream. The removal can be performed at a certain time period after the retransmission of the END packet. In some examples, removal of out-of-band data from the linked list of an RTP stream is not performed if another signaling event starts before the removal time period.

The insertion module 164 is configured to service a task received from the buffer 160 by first retrieving the shared data structure 132 of the RTP stream referenced by the task. In some embodiments, the insertion module 164 sets the insertion flag and the insertion sequence number in storage area 148 of the shared data structure 132 to appropriate values upon the receipt of an insertion task. As described above, the insertion sequence number indicates the sequence number of an RTP packet that is stolen by the slow-path module 128 and reassigned to a new packet manufactured by the insertion module 164 from out-band data. The insertion flag indicates whether a packet synthesized by the slow-path module 128 has been inserted into the RTP stream since the fast-path module 124 last transmitted an in-band RTP packet via the same stream.

In operation, the insertion module 164 first determines the status of the insertion flag. If the insertion flag is not set, this indicates that the sequence number of an in-band RTP packet has not been stolen by the slow-path module 128 since the most recent transmission of an in-band RTP packet via the RTP stream. In such a case, the insertion module 164 sets the insertion sequence number to one plus the sequence number of the most recently transmitted RTP packet. This insertion sequence number corresponds to the sequence number of the next RTP packet the slow-path module 128 plans to steal and reassign to a new packet manufactured from out-of-band data associated with the RTP stream. In this scenario, the insertion module 164 has stolen the sequence number of only one RTP packet before its arrival at the fast-path module 124.

In contrast, if the insertion flag is already set, this indicates that there has been at least one insertion of a synthesized packet into the RTP stream since the most recent transmission of an in-band RTP packet by the fast-path module 124. In such a situation, the insertion module 164 sets the insertion sequence number as the current insertion sequence number plus one to indicate the sequence number of the next RTP packet the slow-path module 128 plans to steal and reassign to a synthesized packet. In this scenario, the insertion module 164 has "stolen" multiple RTP packets since the arrival of the last in-band RTP packet at the fast-path module 124.

In some embodiments, the insertion module 164 composes a packet using the updated information in the shared data structure 132. The insertion module 164 is adapted to assemble an RTP packet by using out-of-band data as payload of the new packet. In addition, the insertion module 164 incorporates the recorded RTP header in the storage area 140 of the shared data structure 132 as a part of the header field of the new RTP packet. The recorded header in the storage area 140 corresponds to the RTP header of the most recent RTP packet processed by the fast-path module 124. The insertion module 164 can also assign to the synthesized RTP packet a sequence number that is the same as the insertion sequence number in storage area 148 of the shared data structure 132. The assigned sequence number can be stored in the header field of the synthesized RTP packet. Furthermore, the insertion module 164 can write into the header field of the new RTP packet a time stamp.

In some embodiments, the insertion module 164 proceeds to transmit the synthesized packet to the user device 100 associated with the RTP stream under the assigned sequence number. In some embodiments, the insertion module 164 proceeds to coordinate the creation of additional insertion tasks with the scheduler 156 unless the insertion module 164 has completed transmitting all END packets via the RTP stream signaling the end of an out-of-band event for the RTP stream.

The fast-path module 124 is configured to process incoming RTP packets. In some embodiments, the fast-path module 124, upon receiving an RTP packet, stores header information of the packet in the shared data structure 132 for the associated RTP stream. The fast-path module 124 can also record the local arriving time of the RTP packet.

The fast-path module 124 is also configured to transmit or discard a received RTP packet depending on the status of the insertion flag and the insertion sequence number stored in the shared data structure 132 associated with an RTP stream corresponding to the packet. For example, if the insertion flag is not set, this status indicates that the slow-path module 128 has not stolen the sequence number of an RTP packet since the last transmission of an in-band RTP packet for the RTP stream. In such a case, the fast-path module 124 proceeds to transmit the current RTP packet. However, if the insertion flag is set and the sequence number of the current RTP packet is behind or equal to the insertion sequence number, this means that the sequence number of the current RTP packet has been "stolen" and reassigned to a synthesized packet by the slow-path module 128. Accordingly, the fast-path module 124 discards the current RTP packet without transmitting it via the RTP stream. In certain embodiments, the sequence number of the current RTP packet can only be behind the insertion sequence number by at most N, the maximum number of consecutive sequence numbers the slow-path module 128 is allowed to steal before the arrival of the next in-band RTP packet for the RTP stream.

In certain embodiments, if the insertion flag is set and the sequence number of the current RTP packet surpasses the insertion sequence number, this indicates that all the RTP packets associated with the "stolen" sequence numbers have already been discarded by the fast-path module 124. Hence, the fast-path module 124 can transmit the current RTP packet via the RTP stream. The fast-path module 124 can also set the insertion flag appropriately to indicate that no additional RTP packets will be discarded.

In some embodiments, mechanisms are implemented to avoid a race condition between the fast-path module 124 and the slow-path module 128 created when they access one or more shared data structures 132 at relatively the same time. For example, to avoid the race condition, the fast-path module 124 records in a common area the pointers to the shared data structures 132 it is currently accessing. The burden is on the slow-path module 128 to check the common area to determine whether the shared data structures 132 it wants to access are being used by the fast-path module 124. If so, the slow-path module 128 waits for an appropriate amount of time to access the shared data structures 132 to avoid collision. In some embodiments, the slow-path module 128 has access priority and the fast-path module 124 waits for its turn to access the desired shared data structures 132 if they are being used by the slow-path module 128.

Figure 3:
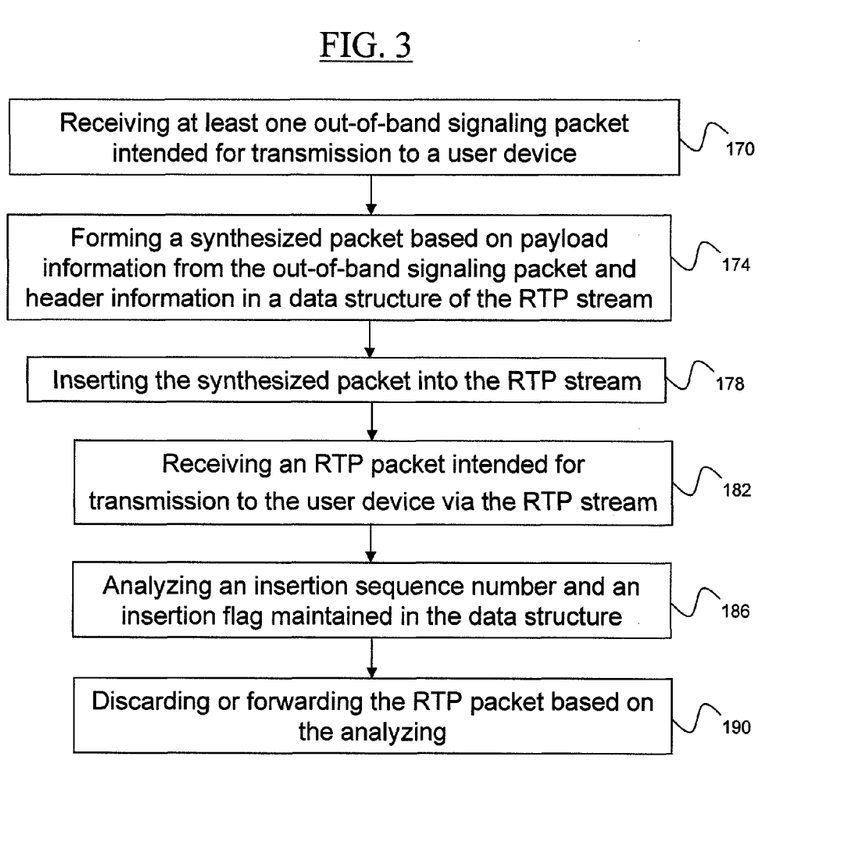
FIG. 3 shows a flow diagram illustrating an exemplary process for inserting out-of-band data into in-band data streams.

FIG. 3 shows a flow diagram illustrating an exemplary process for inserting out-of-band data into in-band data streams. The process starts upon the CPU 136 of the communication system 106 receiving one or more out-of-band signaling packets intended for transmission to a user device (step 170). The out-of-band-signaling packets are associated with at least one out-of-band signaling event for an RTP stream. In some embodiments, The CPU sends a START command to the slow-path module 128 in response to detecting the start of the out-of-band signaling event. Upon receiving the START command, the scheduler 156 can start scheduling insertion tasks for the RTP stream. Each task requires the insertion module 164 to create an RTP packet from the out-of band data and insert the new packet into the RTP stream for transmission to the intended user device 100. For each insertion task, the insertion module 164 updates the insertion flag and the insertion sequence number of the shared data structure 132 corresponding to the RTP stream identified by the task. The insertion module 164 is also adapted to form a synthesized packet based on payload information of an out-of-band packet and header information stored in the shared data structure 132 (step 174). In addition, the insertion module 164 can assign to the synthesized packet the updated insertion sequence number before transmitting the synthesized packet via the RTP stream (step 178). The updated insertion sequence number can be written into the header field of the synthesized packet.

The fast-path module 124 is configured to receive and process an RTP packet intended for transmission to an user device via an RTP stream (step 182). Upon receiving an RTP packet, the fast-path module 124 also decides whether to transmit or discard the RTP packet by analyzing the insertion sequence number and the insertion flag maintained in the shared data structure 132 of the RTP stream associated with the packet (step 186). Based on the analysis, if the fast-path module determines that the sequence number of the RTP packet was stolen by the slow-path module 128 and reassigned to a synthesized packet, the fast-path module 124 discards the RTP packet from transmission to the intended user device 100; otherwise the fast-path module 124 transmits the RTP packet (step 190).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for inserting an out-of-band signaling packet into a real-time protocol (RTP) stream, comprising:
   receiving, by a computing device, the out-of-band signaling packet intended for transmission to a user device;
   forming, by the computing device, a synthesized packet based on payload information from the out-of-band signaling packet and header information stored in a data structure describing the RTP stream;
   inserting, by the computing device, the synthesized packet into the RTP stream;
   updating an insertion sequence number in the data structure to signal to the computing device an RTP packet to be discarded;
   ensuring that an insertion flag maintained in the data structure is set;
   receiving, by the computing device, an RTP packet intended for transmission to the user device via the RTP stream;
   analyzing, by the computing device, the insertion sequence number and the insertion flag maintained in the data structure; and
   discarding or forwarding the RTP packet via the RTP stream, by the computing device, based on the analyzing.

2. The computer-implemented method of claim 1 wherein the receiving of the out-of-band signaling packet, the forming and the inserting are performed by a first module of the computing device.

3. The computer-implemented method of claim 1 wherein the receiving of the RTP packet, the analyzing and the discarding or forwarding are performed by a second module of the computing device.

4. The computer-implemented method of claim 1 further comprising processing the RTP packet by storing header information of the RTP packet in the data structure.

5. The computer-implemented method of claim 1 further comprising discarding the RTP packet having a sequence number equal to the insertion sequence number.

6. The computer-implemented method of claim 1 wherein forming the synthesized packet further comprises creating a timestamp for the synthesized packet that is associated with a signaling event.

7. The computer-implemented method of claim 1 further comprising discarding the RTP packet if the insertion flag is set and a sequence number of the RTP packet is equal or behind the insertion sequence number.

8. The computer-implemented method of claim 1 wherein the RTP packet is forwarded via the RTP stream if the insertion flag is not set or a sequence number of the RTP packet exceeds the insertion sequence number.

9. The computer-implemented method of claim 1 wherein updating the insertion sequence number comprises adding one to the insertion sequence number.

10. The computer-implemented method of claim 9 wherein the computing device has formed at least one other synthesized packet since processing a RTP packet that was not discarded.

11. The computer-implemented method of claim 1 wherein updating the insertion sequence number comprises adding one to a sequence number of a last RTP packet that the computing device processed and did not discard.

12. The computer-implemented method of claim 11 wherein the computing device has not formed another synthesized packet since processing the last RTP packet.

13. A computing device for inserting an out-of-band signaling packet into a real-time protocol (RTP) stream, comprising:
   a module storing a data structure describing the RTP stream, the data structure maintaining an insertion sequence number and an insertion flag;
   a fast path module for receiving an RTP packet intended for transmission to the user device via the RTP stream, analyzing the insertion sequence number and the insertion flag, and discarding or forwarding the RTP packet based on the analyzing; and
   a slow path module for receiving the out-of-band signaling packet intended for transmission to a user device, forming a synthesized packet based on payload information from the out-of-band signaling packet and header information stored in the data structure, and inserting the synthesized packet into the RTP stream, the slow path module including a buffer for storing an insertion task for an out-of-band signaling event until an insertion module of the slow path module processes the insertion task.

14. The computing device of claim 13 wherein the slow path module comprises a scheduler for scheduling the insertion task for the out-of-band signaling event.

15. A method for inserting an out-of-band signaling packet into a real-time protocol (RTP) stream, comprising:
   receiving, by a computing device, the out-of-band signaling packet intended for transmission to a user device;
   scheduling, by the computing device, an insertion task for the out-of-band signaling packet;
   storing, by the computing device, the insertion task in a buffer until the computing device processes the insertion task;
   forming, by the computing device, a synthesized packet based on payload information from the out-of-band signaling packet and header information stored in a data structure describing the RTP stream;
   inserting, by the computing device, the synthesized packet into the RTP stream;
   receiving, by the computing device, an RTP packet intended for transmission to the user device via the RTP stream;
   analyzing, by the computing device, an insertion sequence number and an insertion flag maintained in the data structure; and
   discarding or forwarding the RTP packet via the RTP stream, by the computing device, based on the analyzing.

16. A method for inserting an out-of-band signaling packet into a real-time protocol (RTP) stream, comprising:
- receiving, by a computing device, the out-of-band signaling packet intended for transmission to a user device;
- forming, by the computing device, a synthesized packet based on payload information from the out-of-band signaling packet and header information stored in a data structure describing the RTP stream;
- inserting, by the computing device, the synthesized packet into the RTP stream;
- receiving, by the computing device, an RTP packet intended for transmission to the user device via the RTP stream, said RTP packet including a sequence number, said sequence number of the RTP packet being behind an insertion sequence number by less than a predetermined number of RTP packets that the computing device is allowed to consume for out-of-band signaling during a time period;
- analyzing, by the computing device, the insertion sequence number and an insertion flag maintained in the data structure; and
- discarding or forwarding the RTP packet via the RTP stream, by the computing device, based on the analyzing, said RTP packet being discarded if the insertion flag is set and a sequence number of the RTP packet is equal or behind the insertion sequence number.

17. A computer program product, tangibly embodied in a non-transitory computer readable medium, for inserting an out-of-band signaling packet into a real-time protocol (RTP) stream, the computer program product including instructions being operable to cause a data processing apparatus to:
- receive the out-of-band signaling packet intended for transmission to a user device;
- form a synthesized packet based on payload information from the out-of-band signaling packet and header information stored in a data structure describing the RTP stream;
- insert the synthesized packet into the RTP stream;
- update an insertion sequence number in the data structure to signal to the computing device an RTP packet to be discarded;
- ensure that an insertion flag maintained in the data structure is set;
- receive an RTP packet intended for transmission to the user device via the RTP stream;
- analyze the insertion sequence number and the insertion flag maintained in the data structure; and
- discard or forward the RTP packet based on the analyze.

* * * * *